United States Patent [19]

Yoshizawa et al.

[11] Patent Number: 4,589,901
[45] Date of Patent: May 20, 1986

[54] APPARATUS FOR AND METHOD OF BENDING GLASS SHEETS

[75] Inventors: Hideo Yoshizawa, Kanagawa; Masaaki Nushi, Tokyo; Kaoru Sakurai, Kanagawa; Hirotaro Usui; Naohiro Iida, both of Tokyo; Togo Tanaka, Kanagawa; Seiichiro Honjo, Tokyo, all of Japan

[73] Assignee: Nippon Sheet Glass Co., Ltd., Osaka, Japan

[21] Appl. No.: 757,013

[22] Filed: Jul. 19, 1985

[30] Foreign Application Priority Data

Jul. 19, 1984 [JP] Japan .................. 59-151102
May 24, 1985 [JP] Japan .................. 60-111762

[51] Int. Cl.⁴ .......................................... C03B 23/02
[52] U.S. Cl. ........................................ 65/107; 65/106; 65/268; 65/273
[58] Field of Search ............... 65/106, 107, 245, 253, 65/104, 268, 273

[56] References Cited

U.S. PATENT DOCUMENTS

| 3,265,484 | 8/1966 | Ritter, Jr. | 65/106 X |
|---|---|---|---|
| 3,454,389 | 7/1969 | O'Connell et al. | 65/351 |
| 3,529,947 | 9/1970 | Frank | 65/104 |
| 3,554,724 | 1/1971 | Ritter, Jr. et al. | 65/107 |
| 3,573,022 | 3/1971 | Frank | 65/104 |
| 3,595,636 | 7/1971 | Posney | 65/287 |
| 3,734,706 | 5/1973 | Ritter, Jr. | 65/104 |
| 4,092,141 | 5/1978 | Frank | 65/273 X |
| 4,197,108 | 4/1980 | Frank et al. | 65/273 |
| 4,272,274 | 6/1981 | Frank et al. | 65/273 |
| 4,447,252 | 5/1984 | Di-Nocco et al. | 65/268 |

Primary Examiner—Arthur Kellogg
Attorney, Agent, or Firm—Irving M. Weiner; Joseph P. Carrier; John J. Cantarella

[57] ABSTRACT

An apparatus for bending a glass sheet has at least a lower mold, a conveyor device for conveying the heated glass sheet to a prescribed position over the lower mold, and a plurality of rolls for supporting the glass sheet in the prescribed position. A method of bending a glass sheet is carried out by utilizing the apparatus. The apparatus also includes a device for lowering the rolls to a position below the shaping surface of the lower mold, and an arrangement in the lower mold for accommodating the rolls which have been lowered. The apparatus may additionally have an upper mold coacting with the lower mold. The method comprises the steps of lowering the rolls below the shaping surface of the lower mold, transferring the glass sheet from the rolls onto the shaping surface of the lower mold while the rolls are lowered, and bending the glass sheet into conformity with the shaping surface of the lower mold under gravitational forces. The method may also include the step of lowering the upper mold simultaneously with the downward movement of the rolls, and press bending the glass sheet between the upper and lower molds.

36 Claims, 25 Drawing Figures

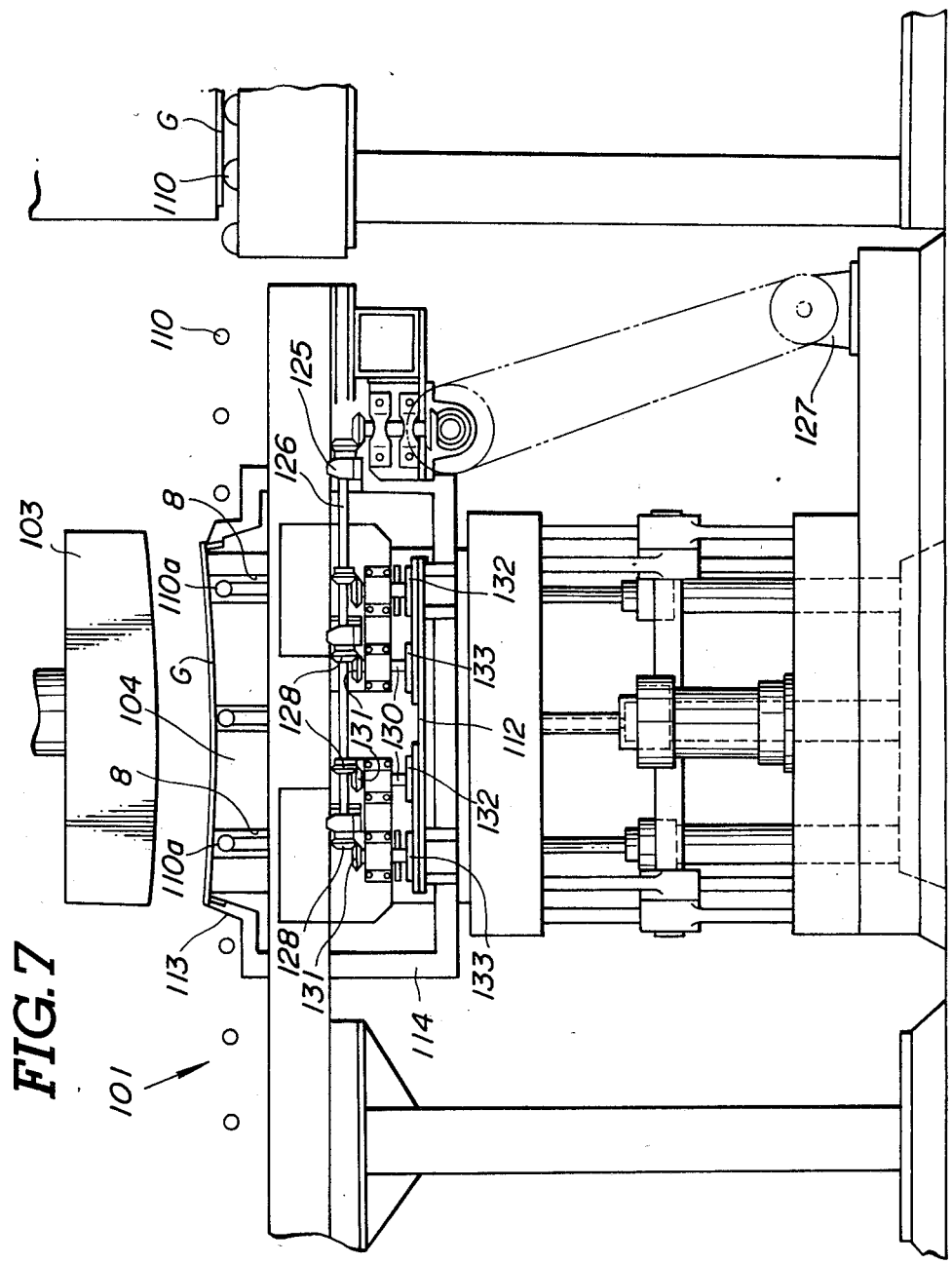

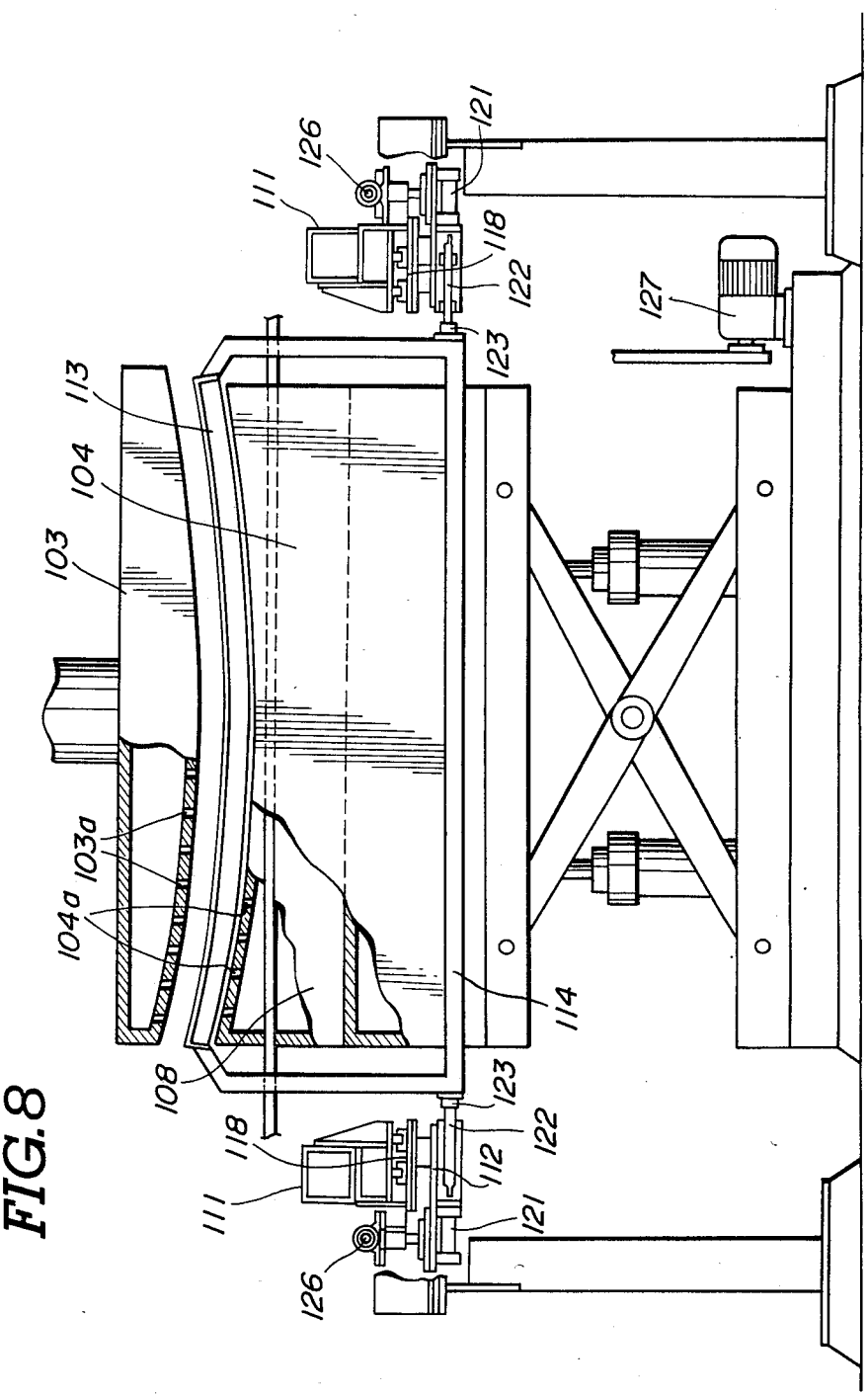

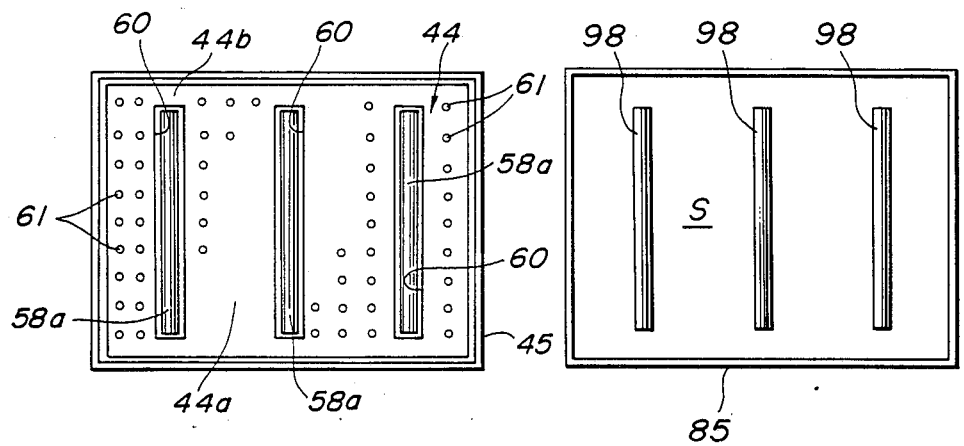
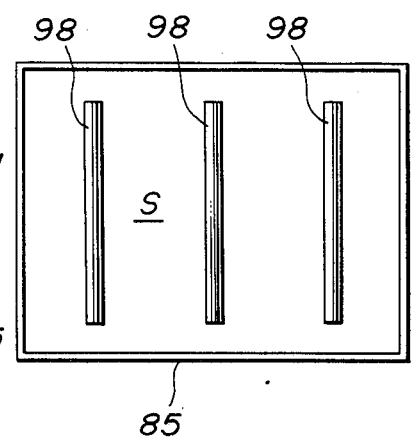
FIG.18  FIG.20
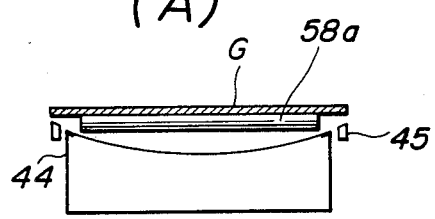
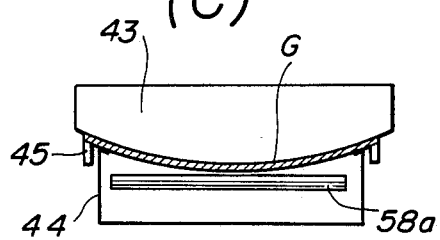
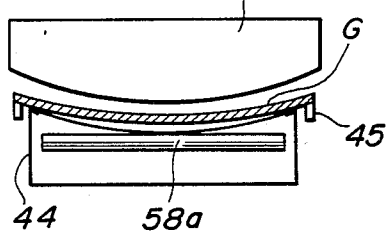
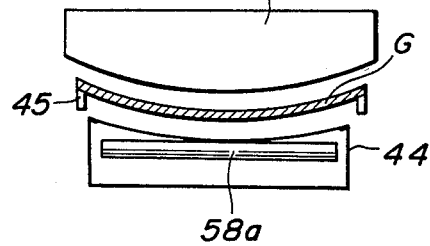
FIG.19 (A)  FIG.19 (C)
FIG.19 (B)  FIG.19 (D)

APPARATUS FOR AND METHOD OF BENDING GLASS SHEETS

BACKGROUND OF THE INVENTION

1. Field of the Invention

The present invention relates to an apparatus for bending glass sheets conveyed along a horizontal path from a furnace, either between upper and lower molds or under gravitational forces, and a method of bending glass sheets by employing such an apparatus.

2. Description of the Relevant Art

Various method and apparatus for producing bent glass sheets for use in vehicles such as automobiles or the like have been proposed in the art. U.S. Pat. No. 3,595,636 to Posney discloses a glass sheet bending apparatus for pressing and then quenching a glass sheet conveyed vertically from a furnace between vertical molds. U.S. Pat. Nos. 3,529,947 and 3,573,022 to Frank disclose apparatus for pressing and quenching a glass sheet conveyed horizontally from a furnace, between upper and lower molds. U.S. Pat. Nos. 3,476,540 and 3,554,724 to Ritter, Jr., et al reveal glass sheet bending apparatus in which when a heat softened glass sheet is deposited on conveyor rolls in the bending apparatus, a ring-type lower mold member is moved upwardly to cause the glass sheet to sag into conformity with the shaping surface of the lower mold member under inertial and gravitational forces on the glass sheet. U.S. Pat. Nos. 4,197,108 and 4,272,274 to Frank et al show apparatus in which a lower shaping mold composed of a solid block having a plurality of elongated shaping memers with smooth upper concave surfaces is lifted from below conveyor rolls to cause the glass sheet to sag into a bent shape on the lower shaping mold under gravitational forces. Similarly, U.S. Pat. No. 3,454,389 to O'Connell et al shows apparatus in which a lower shaping mold composed of a plurality of spaced, elongated shaping members with smooth upper concave surfaces is lifted from below conveyor rolls to cause the glass sheet to sag into a bent shape on the lower shaping mold under gravitational and inertial forces. U.S. Pat. No. 3,734,706 Ritter, Jr. disclosed an apparatus having a ring-type lower mold movable upwardly from below conveyor rolls to bend a glass sheet on the lower mold under inertial and gravitational forces, the bent glass sheet being rapidly chilled.

In such conventional apparatus, or discussed above, in which the glass sheet is raised off the conveyor rolls by the ring-type lower mold, the glass sheet sags or flexes in its central area under inertial forces created as it is lifted against the mass of air present over the upper surface of the glass sheet, and under the gravitational forces acting on the mass of the glass sheet. The central area of the glass sheet having the inertial-induced sag remains in contact with the conveyor rolls for a prolonged period of time. Those portions of the glass sheet which are kept in contact with the conveyor rolls are cooled more rapidly than the other glass sheet portions, and are subject to optical defects. The other conventional apparatus discussed above wherein the lower mold, in the form of a solid block having a shaping surface conforming substantially to the entire surface of a glass sheet, is raised to lift the glass sheet off the conveyor rolls are disadvantageous in that if the heated and softened glass sheet were deposited on the shaping surface immediately over virtually the entire surface of the glass sheet, then the important central area of the glass sheet would be liable to have optical defects.

The present invention has been made in an effort to eliminate the problems and disadvantages of the conventional apparatus.

SUMMARY OF THE INVENTION

Accordingly, it is an object of the present invention to prevent a heat softened glass sheet from sagging under inertial forces in a central area thereof in bending the glass sheet, and hence to shorten the period of time in which the glass sheet remains in contact with conveyor rolls, thereby reducing optical defects produced in the bent glass sheet.

According to the present invention, the above object is achieved by an apparatus for bending a glass sheet, comprising: a lower mold having an upper shaping surface; conveyor means for conveying the glass sheet as heated to a prescribed position over the shaping surface of the lower mold, the conveyor means including a plurality of rolls for supporting the glass sheet in the prescribed position; means for vertically moving the rolls between an elevated position to support the glass sheet in the prescribed position and a lowered position below the shaping surface of the lower mold; and means in the lower mold for accommodating the rolls when they are moved into the lowered position.

According to the present invention, there is also provided a method of bending a glass sheet, comprising the steps of: conveying the glass sheet as heated horizontally to a prescribed position over the upper shaping surface of a lower mold; stopping the glass sheet when it is deposited on a plurality of rolls which supports the glass sheet in the prescribed position; and moving the rolls from an elevated position in which they support the glass sheet in the prescribed position to a lowered position below the shaping suface of the lower mold, during which time the glass sheet is transferred onto the shaping surface, whereby the glass sheet is bent into conformity with the shaping surface under gravitational forces.

According to the method of and the apparatus for bending glass sheets, the glass sheet conveyed by the rolls along a horizontal path to a shaping station is deposited on the lower mold when the rolls descend, while being subject to the resistance of air against the lower surface of the glass sheet, but without resisting gravitational forces. Therefore, the glass sheet is effectively prevented from sagging in its central area, and the pressure under which the glass sheet contacts the conveyor rolls can be lowered. Since the glass sheet is transferred from the rolls onto the lower mold upon downward movement of a vertically movable device which supports the rolls, the glass sheet can quickly be transferred so that the time during which the glass sheets remain in contact with the rolls can be minimized.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a front elevational view of a glass sheet bending apparatus incorporating an oscillation device.

FIG. 8 is a side elevational view, partly in cross section, of the glass sheet bending apparatus shown in FIG. 7.

FIG. 18 is plan view of a lower mold and a ring mold in the glass sheet bending apparatus of FIG. 17.

FIGS. 19(A) through 19(D) are schematic views explanatory of a method of progressively bending a glass sheet according to the present invention.

FIG. 20 is a plan view of a lower mold in the form of a ring mold.

DETAILED DESCRIPTION OF THE PREFERRED EMBODIMENTS

Figure 1:
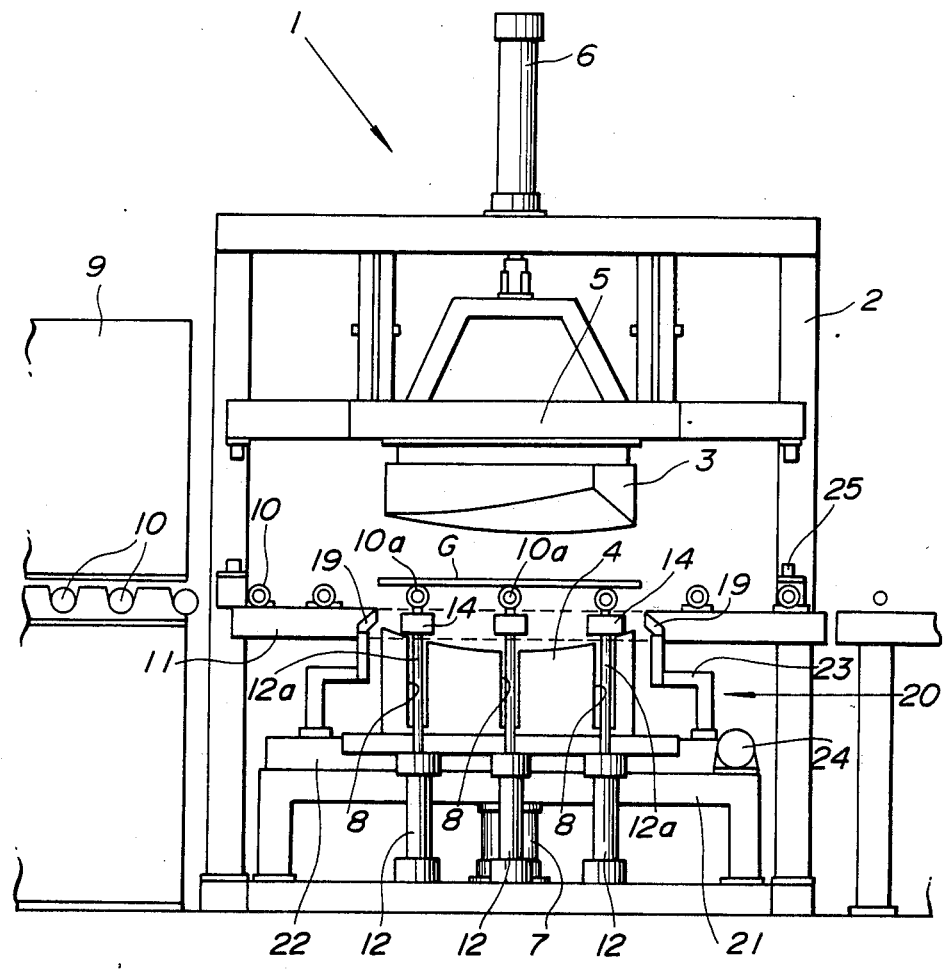
FIG. 1 is a front elevational view of a glass sheet bending apparatus according to a first embodiment of the present invention.
Figure 2:
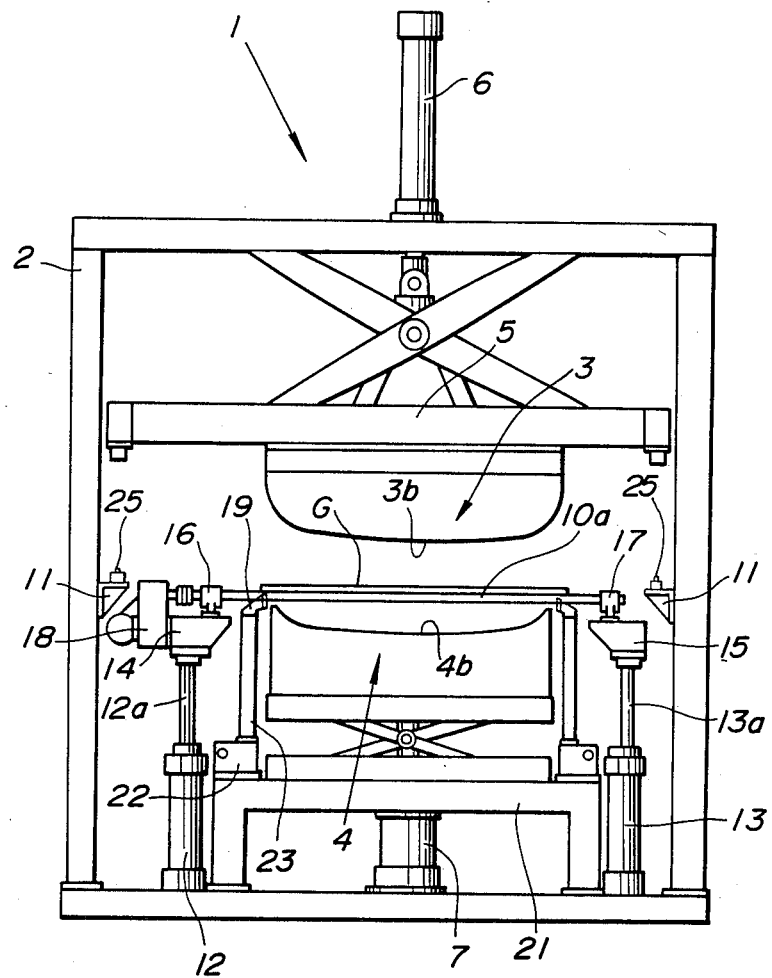
FIG. 2 is a side elevational view of the glass sheet bending apparatus shown in FIG. 1.
Figure 3:
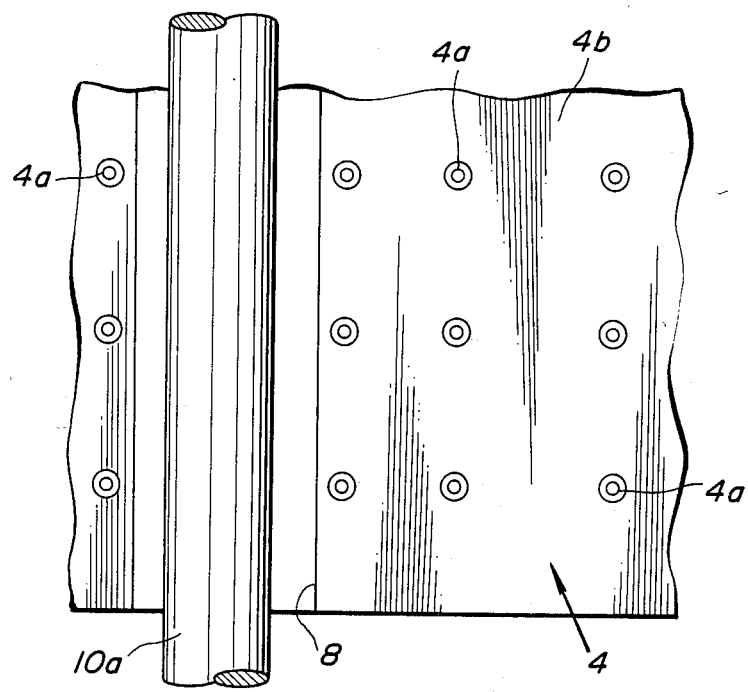
FIG. 3 is an enlarged fragmentary plan view of a lower mold in the glass sheet bending apparatus.

As shown in FIGS. 1 and 2, a glass sheet bending apparatus 1 according to a first embodiment of the present invention has a frame 2 housing therein an upper mold 3 and a lower mold 4. The upper mold 3 is attached to a support plate 5 movable upwardly and downwardly by a fluid cylinder unit 6 mounted on the top of the frame 2. The lower mold 4 is movable upwardly and downwardly by a fluid cylinder unit 7 mounted on the bottom of the frame 2. As illustrated in FIG. 2, the lower mold 4 has a concave shaping surface 4b extending in substantially coextensive relation to a glass sheet G to be bent, and also has plurality of holes defined in the upper surfaces and opening upwardly. As shown in FIG. 3, the lower mold 4 has a plurality of air nozzles 4a disposed respectively in the holes and having tip ends retracted below the shaping surface of the lower mold 4. The upper mold 3 has a convex shaping surface 3b (FIG. 2) and also a plurality of air nozzles (not shown) identical to those in the lower mold 4.

The lower mold 4 has a plurality of vertical slots 8 positioned out of interference with the nozzles 4a and extending fully transversely across the lower mold 4 to divide the shaping surface 3b into segments.

Figure 5:
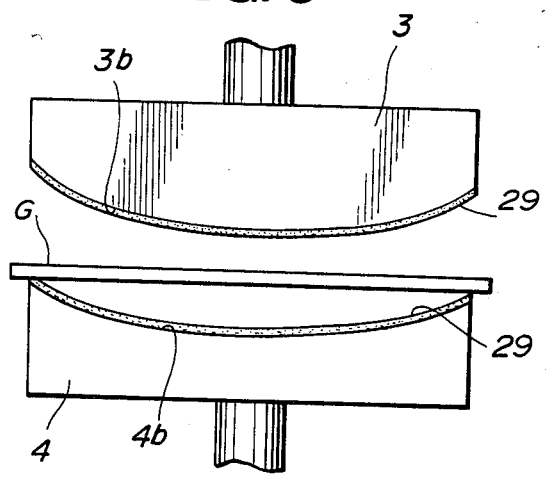
FIG. 5 is a side elevational view of a shaping mold assembly.
Figure 6:
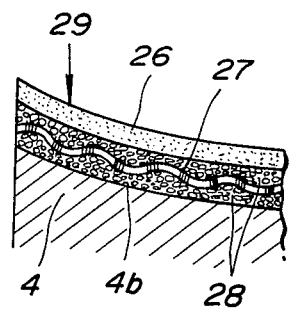
FIG. 6 is an enlarged fragmentary cross-sectional view a lower mold.

As illustrated in FIG. 5, sheets 29 of felt are bonded to the shaping surfaces 3b, 4b of the upper and lower molds 3, 4, respectively. As shown in FIG. 6 on an enlarged scale, each of the felt sheets 29 is composed of a mat of fibers 26 positioned for direct contact with a glass sheet G to be bent, a base fabric 27 below the fiber mat 26, and two mats of fibers 28 disposed one on each side of the base fabric 27. In the illustrated embodiment, the fiber mats 26, 28 are arranged as two layers stacked in the transverse direction of the felt sheet 29. The fiber mat 26 for direct contact with the glass sheet G is chiefly composed of fibers which are highly resistant to heat, such as steel fibers. The fiber mat 28 held in direct contact with the shaping surface 4b is chiefly composed of fibers which are excellent in mechanical strength, such as aramid fibers.

Figure 4:
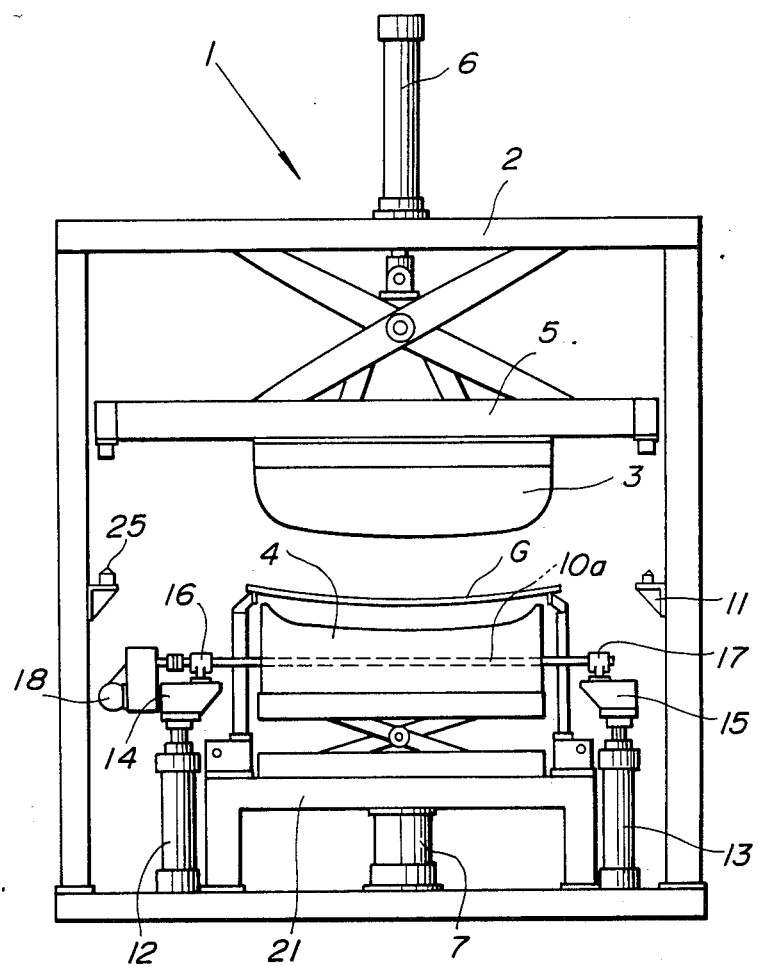
FIG. 4 is a side elevational view of the glass sheet bending apparatus as it is about to bend a glass sheet.

As shown in FIG. 1, a furnace 9 is positioned on one side of the bending apparatus 1, and accommodates therein a plurality of laterally elongate conveyor rolls 10 for conveying the glass sheet G. The conveyor rolls 10 jointly define a horizontal feed path for travel of the glass sheet G therealong. A pair of roll support beams 11 (FIG. 4) is fixed horizontally to the frame 2 of the bending apparatus 1 at a vertical position which is substantially the same as that of the exit slot of the furnace 9. The roll support beams 11 are laterally spaced from each other, and laterally elongate conveyor rolls 10 identical to the conveyor rolls 10 in the furnace 9 are rotatably mounted on the roll support beams 11.

Two sets of fluid cylinder units 12, 13 are vertically disposed on the bottom of the frame 2, one on each side of the lower mold 4. The fluid cylinder units 12, 13 have piston rods 12a, 13a supporting heads 14, 15 on their upper ends. To the heads 14, 15, there are fixed bearings 16, 17 by which laterally elongate conveyor rollers 10a identical to the conveyor rolls 10 are rotatably supported. The conveyor rolls 10a are rotatable by motors 18 mounted respectively on the heads 14.

The conveyor rolls 10a are disposed in vertical alignment with the slots 8 in the lower mold 4 and normally positioned above the slots 8 before the bending apparatus 1 is operated. When the cylinder units 12, 13 are actuated to retract the piston rods 12a, 13a, the conveyor rolls 10a are moved downwardly to enter the slots 8, respectively, until the shaping surface 4b of the lower mold 3 is positioned above the conveyor rolls 10a.

An oscillation device 20 disposed in the frame 2 for assisting in quenching and tempering the glass sheet G has on its upper end a ring-shaped auxiliary mold 19 extending around the lower mold 4. The oscillation device 20 is composed of a base 21 mounted on the bottom of the frame 2, a movable bed 22 mounted on the base 21 for longitudinal and transverse movements, arms 23 disposed vertically on the movable bed 22 and supporting the ring mold 19 thereon, and a motor 24 fixedly mounted on the base 21. The movable bed 22 is reciprocally movable in a circular or elliptical horizontal pattern by the motor 24 through a gear train or a link mechanism (not shown) to allow the bent glass sheet G on the ring mold 19 to be cooled uniformly by cooling air ejected from the nozzles 4a in the upper and lower molds 3, 4.

Operation of the bending apparatus 1 for bending a glass sheet will be described below.

The glass sheet G is placed on the conveyor rolls 10. By rotating the conveyor rolls 10, the glass sheet G is moved through the furnace 9 in which the glass sheet G is heated up to its softening temperature. The heat softened glass sheet G is then conveyed from the furnace 9 by the conveyor rolls 10, 10a in the bending apparatus 1 along the horizontal feed path to a predetermined position between the upper and lower molds 3, 4. When the glass sheet G has reached the position between the upper and lower molds 3, 4, the motors 18 are de-energized to stop the glass sheet G. At this time, the upper mold 3 is in its upper position, and the lower mold 4 is positioned downwardly of the conveyor rolls 10a. The ring mold 19 has its upper surface positioned in the outward peripheral extension of the shaping surface 4b of the lower mold 4.

Then, the fluid cylinder units 12, 13 are operated to lower the conveyor rolls 10a. Since the slots 8 in the lower mold 4 are located directly below the conveyor rolls 10a, the descending conveyor rolls 10a enter the slots 8, respectively, until the shaping surface 4b of the lower mold 4 is positioned above the conveyor rolls 10a. The peripheral edge of the glass sheet G which has been placed on the conveyor rolls 10a is therefore supported on the ring mold 19, with the central area of the glass sheet G being kept out of contact with the shaping surface 4b of the lower mold 4.

At the same time that the conveyor rolls 10a are lowered, the fluid cylinder unit 6 is actuated to move the upper mold 3 downwardly until it engages limit switches 25 mounted on the beams 11. The central area of the glass sheet G is now pressed against the lower mold 4 by the upper mold 3, and the glass sheet G is bent to the shape defined by the shaping surfaces 3b, 4b under gravitational forces and pressing forces applied by the upper mold 3.

After the glass sheet G has been bent, the fluid cylinder unit 7 is operated to lower the lower mold 4 to a position in which it does not interfere with reciprocating movement of the oscillation device 20, and the glass sheet G is supported solely by the ring mold 19. Then, cooling air is ejected from the nozzles 4a in the lower and upper molds 4, 3 against the surfaces of the glass sheet G. Simultaneously, the motor 24 is energized to actuate the oscillation device 20 to move the glass sheet G on the ring mold 19 in the circular or elliptical pattern for allowing the cooling air ejected from the nozzles 4a to be applied uniformly against the surfaces of the glass sheet G, thus quenching and tempering the glass sheet G.

Thereafter, the fluid cylinder unit 6 is actuated again to raise the upper mold 3. The fluid cylinder units 12, 13 are also operated to move the conveyor rolls 10a upwardly to lift the glass sheet G off the ring mold 19. The motors 18 are then energized to rotate the conveyor rolls 10a to deliver the bent glass sheet G out of the bending apparatus 1 to a next processing station.

FIGS. 7 through 13 illustrate a modified oscillation device which may be incorporated in the bending apparatus shown in FIGS. 1 through 6. The modified oscillation device has a pair of movable plates supported respectively on roll support beams disposed on the opposite sides of the glass sheet feed path.

As shown in FIGS. 7 and 8, a substantially ring-shaped mold 113 is disposed on the upper end of a support frame 114 extending around a lower mold 104. The mold 113 has open lateral sides so that it will not interfere with conveyor rolls 110a when it is moved upwardly with the lower mold 104.

Figure 9:
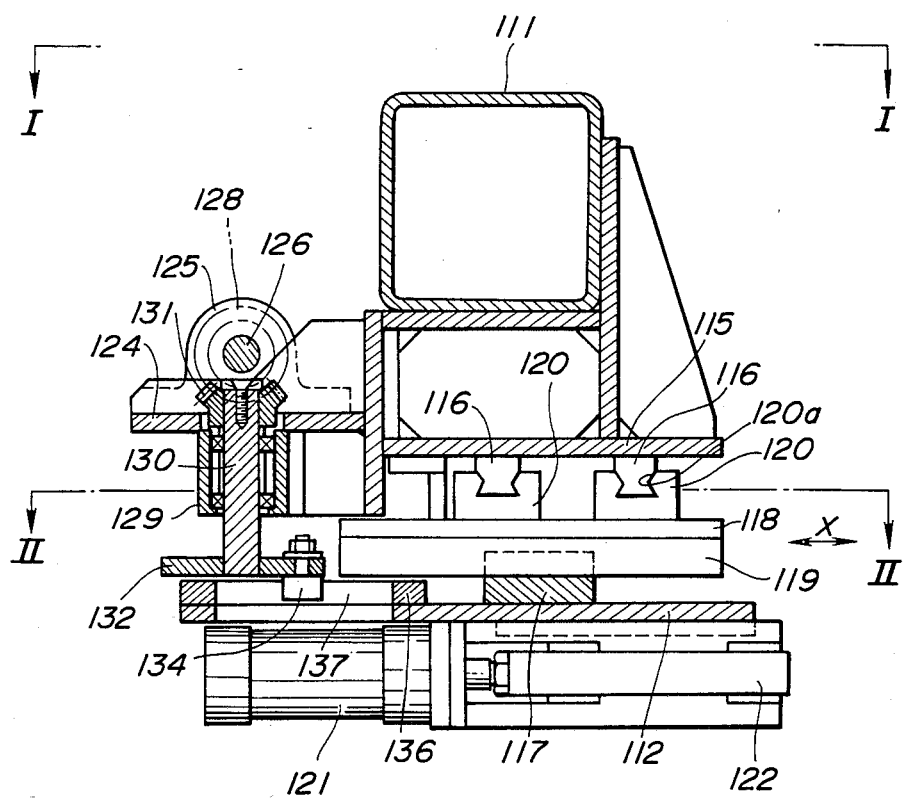
FIG. 9 is an enlarged cross-sectional view of a portion of the glass sheet bending apparatus illustrated in FIG. 8.
Figure 10:
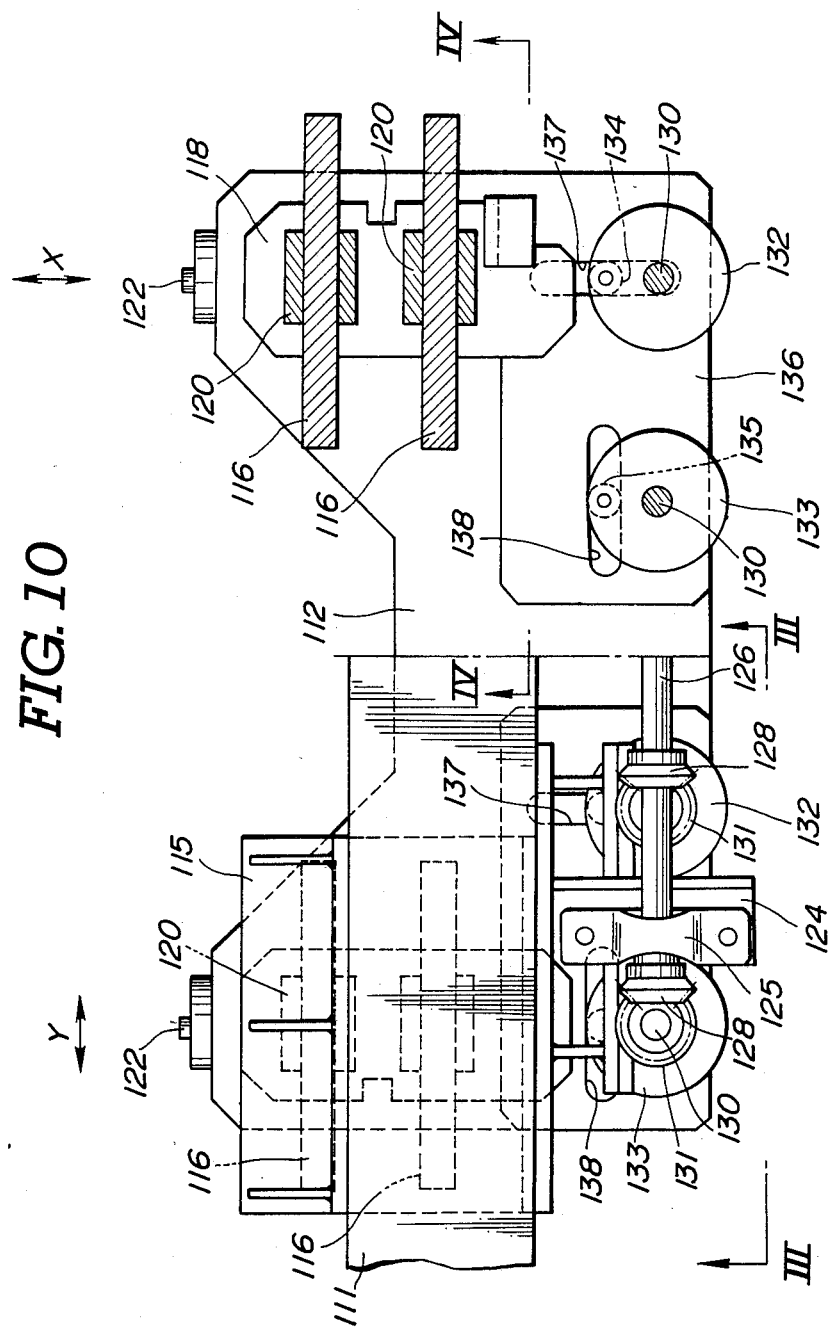
FIG. 10 is a plan view of the structure illustrated in FIG. 9, with the lefthand half viewed from a plane A defined by and viewed in the direction of arrows I—I and the righthand half viewed from a plane B defined by and viewed in the direction of arrows II—II.
Figure 11:
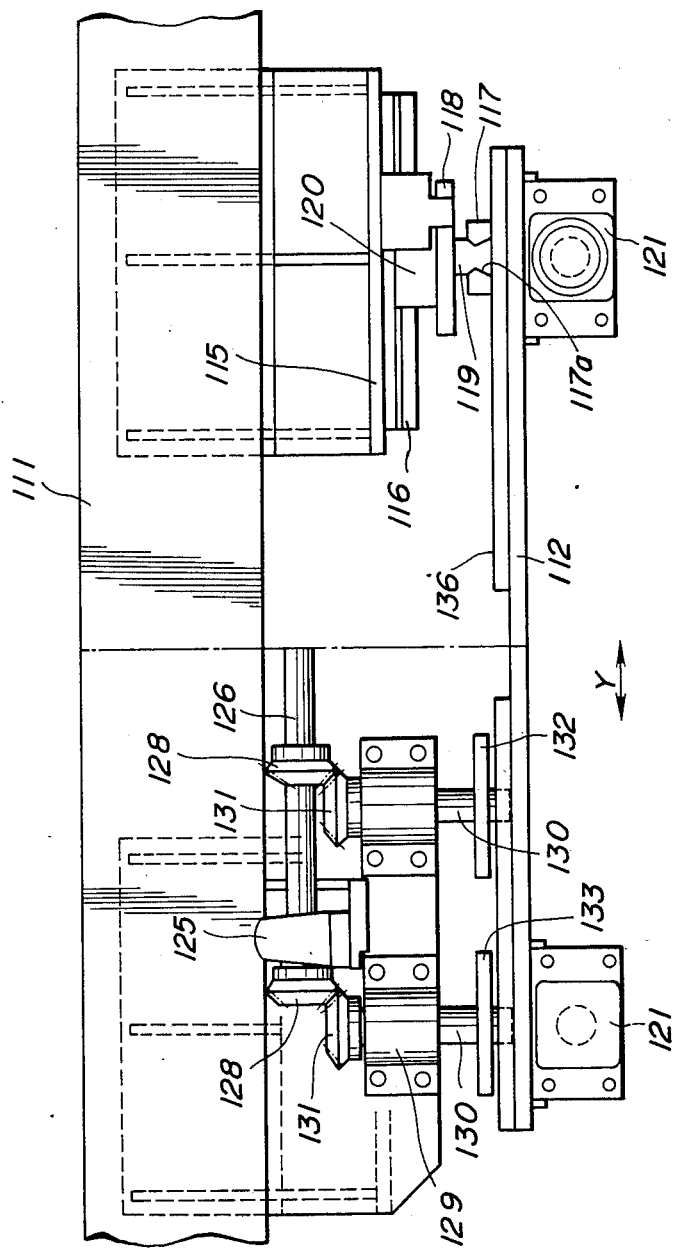
FIG. 11 is a front elevational view of the structure of FIG. 10, with the lefthand half viewed from a plane C defined by and viewed in the direction of arrows III—III and the righthand half viewed from a plane D defined by and viewed in the direction of arrows IV—IV.

A pair of movable plates 112 and a mechanism for moving the movable plates 112 are shown in FIGS. 9 through 11.

Each of the movable plates 112 is supported on a support beam 111 for movement in the directions of the arrows X, Y. More specifically, a stationary plate 115 is fixed to the support beam 111 exteding along the glass sheet feed path in a bending apparatus 101 (FIG. 7). Rails 116 are secured to the underside of the stationary plate 115 and extend in the direction of the arrow Y. A rail guide 117 extending in the direction of the arrow X is attached to the upper side of the movable plate 112. The rails 116 and the rail guide 117 are slidably fitted in and over an intermediate member 118 disposed between the stationary plate 115 and the movable plate 112. The intermediate member 118 has a rail 119 extending in the direction of the arrow X and rail guides 120 having guide grooves 120a extending in the direction of the arrow Y. The rail 119 is slidably fitted in the guide groove 117a in the rail guide 117, and the rails 116 are slidably fitted in the guide grooves 120a, respectively, in the rail guides 120. The rails 116, 119 have a cross-sectional shape with a constricted intermediate portion, and the guide grooves 117a, 120a have a complementary cross-sectional shape.

The movable plate 112 is thus supported on the beam 111 for movements in the directions of the arrows X, Y. The movable plate 112 can therefore be moved in a circular or elliptical horizontal pattern resulting from the combined movements in directions of the arrows X, Y.

Figure 12:
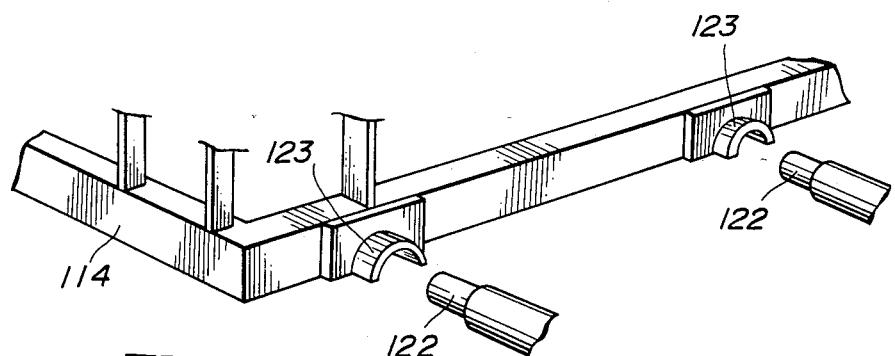
FIG. 12 is a fragmentary perspective view of a mechanism by which a ring mold support frame is held in engagement with rods.

A fluid cylinder unit 121 is fixed to the lower side of the movable plate 112 for moving a rod 122 in the transverse direction of the bending apparatus. As shown in FIG. 12, each of the rods 122 as it projects engages a retainer 123 on the support frame 114 of the ring mold 113 to hold the support frame 114 on the movable plate 112.

Stationary plates 124 are fixed to the support beam 111. A drive shaft 126 extending parallel to the support beam 111 is rotatably supported by bearings 125 mounted on the stationary plate 24. As shown in FIG. 7, the drive shaft 126 is rotatable by a motor 127 mounted on the bottom of the bending apparatus 101. A plurality (four in the illustrated embodiment) of helical gears 128 are fitted over the drive shaft 126 at spaced intervals therealong.

A plurality (four in the illustrated embodiment) of bearings 129 are mounted on the lower side of the stationary plates 124, and vertically extending shafts 130 are rotatably supported by the bearings 129, respectively. The shafts 130, four in number on each side of the glass sheet feed path, support helical gears 131 respectively on their upper ends, which are held in mesh with helical gears 128, respectively, on the drive shaft 126. Therefore, rotation of the drive shaft 126 can be transmitted through the helical gears 128, 131 to the shafts 130.

As illustrated in FIG. 10, two pairs of first and second rotors 132, 133 are fitted over the lower ends of the shafts 130, the first and second rotors 132, 133 in each pair supporting pins 134, 135 extending axially and positioned in eccentric relation to the shafts 130.

A pair of guide plates 136 is mounted on the upper surface of the movable plate 112. Each of the guide plates 136 has a slot 137 extending in the direction of the arrow X and a slot 138 extending in the direction of the arrow Y. The pin 134 on the first rotor 132 has a lower end movably engaging in the slot 137, whereas the pin 135 on the second rotor 133 has a lower end movably engaging in the slot 138.

Operation of the oscillation device of the above construction will be described primarily with reference to FIG. 13. In FIG. 13, only one of the guide plates 136 and one pair of first and second rotors 132, 133 thereon are illustrated for the sake of brevity.

Figure 13A:
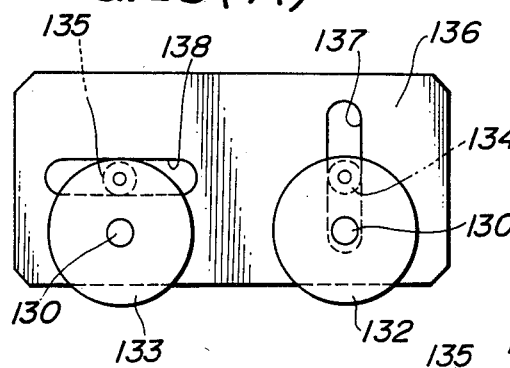
FIGS. 13(A) through 13(C) are schematic plan views showing operation of the oscillation device.
Figure 13B:
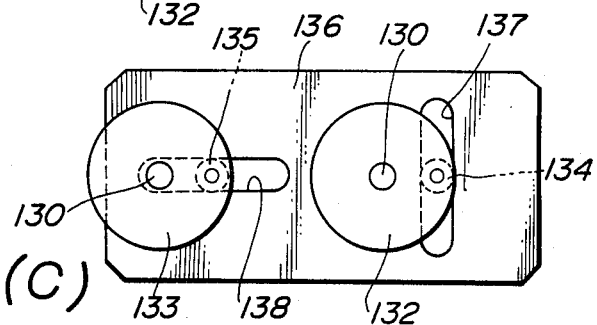
Figure 13C:
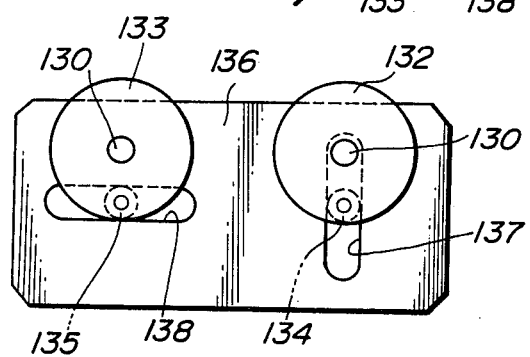

It is assumed that the guide plate 136 and the rotors 132, 133 are initially positioned as shown in FIG. 13(A). The motor 127 is energized to rotate the drive shaft 126. The rotation of the drive shaft 126 is transmitted via the helical gears 128, 131 to the shafts 130 and the first and second rotors 132, 133 mounted thereon. When the first rotor 132 is rotated clockwise (FIG. 13(A)), the guide plate 136 is moved to the right from the initial position, and the pin 135 is moved relatively toward the lefthand end of the slot 138 for an interval equal to the distance over which the guide plate 136 is moved to the right. In response to simultaneous clockwise rotation of the second rotor 133, the guide plate 136 is moved downwardly (FIG. 13(A)) from the initial position, and the pin 134 is moved relatively toward the upper end of the slot 137 for an interval equal to the distance over which the guide plate 136 is moved downwardly. As the above movements of the guide plate 136 are combined, the guide plate 136 is moved rightward and downwardly to the position shown in FIG. 13(B). Upon continued clockwise rotation of the rotors 132, 133, the guide plate 136 is moved to the position of FIG. 13(C) and then back to the initial position of FIG. 13(A).

With the pins 134, 135 displaced equally off center from the corresponding shafts 130, the guide plate 136 and the movable plate 112 joined thereto are caused to move in a circular path. Where the pins 134, 135 are displaced different distances off center from the associated shafts 130, the guide plate 136 and the movable plate 112 are caused to move in an elliptical path. The size of the circular or elliptical pattern can be varied as desired by changing the distances by which the pins 134, 135 are spaced off center from the shafts 130. However, it is preferable that such off-center distances of the pins 134, 135 from the shafts 130 be selected to allow nozzles 103a, 104a in the upper and lower molds 103, 104 to follow overlapping paths over a glass sheet G when it is quenched by cooling air ejected from the nozzles 103a, 104a.

Figure 14:
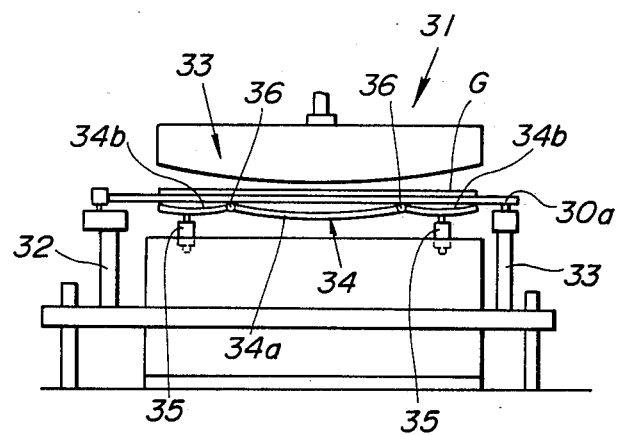
FIG. 14 is a side elevational view of a glass sheet bending apparatus according to a second embodiment of the present invention.
Figure 15:
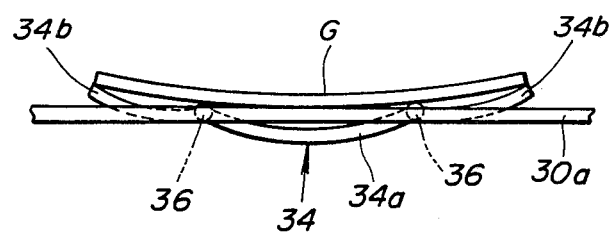
FIG. 15 is a side elevational view of a portion of the glass sheet bending apparatus illustrated in FIG. 14.
Figure 16:
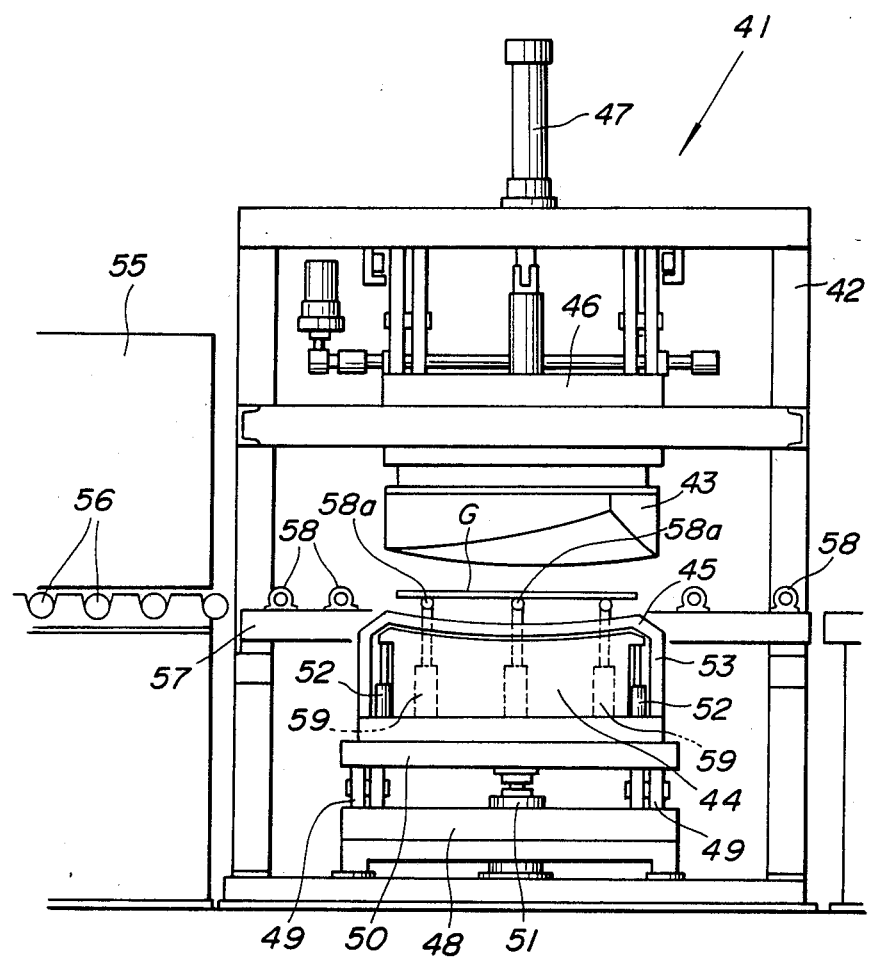
FIG. 16 is a front elevational view of a glass sheet bending apparatus according to a third embodiment of the present invention.
Figure 17:
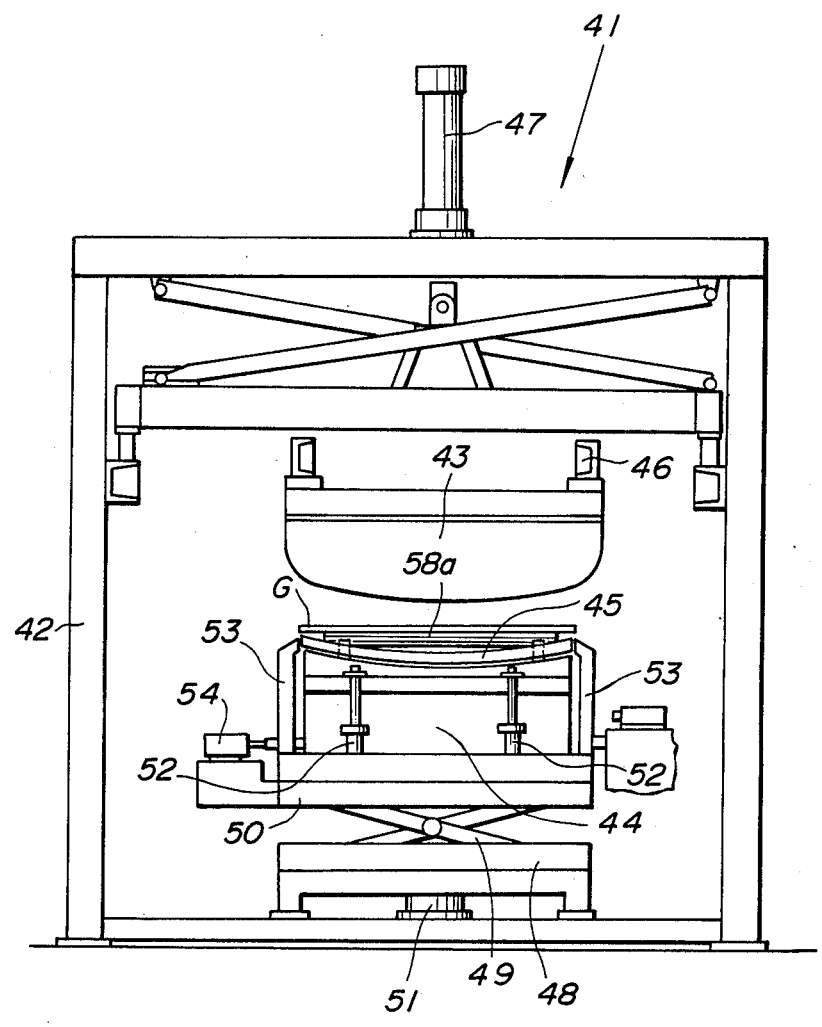
FIG. 17 is a side elevational view of the glass sheet bending apparatus shown in FIG. 16.

FIGS. 14 and 15 schematically show a bending apparatus 31 according to a second embodiment of the present invention. The bending apparatus 31 has upper and lower molds 33, 34 for bending a glass sheet G therebetween. The lower mold 34 is of a segmented ringlike construction composed of a central member 34a and opposite side members 34b, 34b. The side members 34b, 34b are pivotally coupled by pivots 36, 36 to the central member 34a and angularly movable vertically by fluid cylinder units 35, 35.

The bending apparatus 31 also has conveyor rolls 30a vertically movable by fluid cylinder units 32, 33. The lower mold 34 has vertical slots in which the conveyor rolls 30a can be entered when they are lowered.

In operation, a glass sheet G is horizontally conveyed to the bending apparatus 31, and then the conveyor rolls 30a and the upper mold 33 are moved downwardly. When the conveyor rolls 30a are positioned below the pivots 36 on the lower mold 34, the side members 34b, 34b thereof are turned upwardly to the position in which the lower mold 34 is closed with the central and side members 34a, 34b jointly defining a smooth shaping surface of a desired curvature. The glass sheet G is then bent to the desired curvature under gravitational forces and pressing forces of the upper mold 33.

Since the glass sheet G is disengaged from the conveyor rolls 30a when they are positioned downwardly of the pivots 36 before the side members 34b are turned upwardly or at the time the lower mold 34 is open, the time during which the sheet glass G remains in contact with the conveyor rolls 30a is shortened even if the ring-shaped lower mold 34 has a large bending depth and the central area of the the glass sheet G tends to sag. As a consequence, the glass sheet G suffers a reduced amount of optical defects.

While in the aforesaid embodiments the glass sheet is bent between the upper and lower molds, in other embodiments of the present invention the upper mold may be dispensed with, and the glass sheet may be bent only by the lower mold.

In the illustrated embodiments, the lower mold is not lifted during a glass sheet bending process to prevent the glass sheet from suffering inertial forces. However, in other embodiments of the present invention the lower mold may be raised at such a rate that no unwanted inertia-induced sag will be produced in the central area of the glass sheet.

A bending apparatus according to a third embodiment of the present invention will be described with reference to FIGS. 16 through 19. The bending apparatus, generally designated at 41, has upper and lower molds 43, 44 for bending therebetween a glass sheet G supported on a ring mold 45. As shown in FIG. 18, the lower mold 44 has upwardly opening vertical slots 60 in and out of which conveyor rolls 58a are movable. The slots 60 are defined in a central area 44a of the shaping surface of the lower mold 44, but do not extend fully transversely across the shaping surface of the lower mold and hence do not divide the ring mold 45, which is disposed in surrounding relation to the lower mold 44. Therefore, the lower mold 44 has a continuous peripheral edge portion 44b. The upper mold 43 is mounted on a support 46 movable vertically by a fluid cylinder unit 47 fixed to the top of a frame 42.

A base 48 is mounted on the bottom of the frame 42. A lifter plate 50 operatively coupled by links 49 to the base 48 is vertically movable by a fluid cylinder unit 51 mounted on the frame bottom. The lower mold 44 is movable upwardly and downwardly by fluid cylinder units 52 mounted on the lifter plate 50. Support columns 53 are vertically mounted on the lifter plate 50 in surrounding relation to the lower mold 44 and support on their upper ends the ring mold 45 which is coupled by the support columns 53 to an oscillation device 54.

Conveyor rolls 58 for conveying a heated glass sheet G horizontally to a shaping station in the bending apparatus 41 are rotatably supported on roll support beams 57 disposed one on each side of a glass sheet feed path extending through the bending apparatus 41. Conveyor rolls 58a which are positioned above the lower mold 44 are supported on fluid cylinder units 59 disposed on the lifter plate 50 and positioned respectively in the slots 60 in the lower mold 44. When the piston rods of the fluid cylinder units 59 are projected, the conveyor rolls 58a are positioned above the lower mold 44. When the piston rods of the fluid cylinder unit 59 are retracted, the conveyor rolls 58a enter the slots 60, respectively. The conveyor rolls 58a have an outside diameter smaller than the width of the slots 60.

The upper shaping surface of the lower mold 44 is curved except for the open ends of the slots 60. As shown in FIG. 18, a plurality of nozzles 61 are positioned in the shaping surface of the lower mold 44 for ejecting cooling air to quench and temper the glass sheet. The nozzles 61 have tip ends located below the shaping surface of the lower mold 44 so that they will not contact the glass sheet when it is bent to the desired shape. Although not shown, the upper mold 43, also has a plurality of nozzles positioned in the lower shaping surface thereof for ejecting cooling air against the glass sheet.

There is a small gap or clearance between the ring mold 45 and the lower mold 44 surrounded by the ring mold 45. The ring mold 45 has a continuous upper annular surface.

Operation of the bending apparatus 41 will be described below with reference to FIGS. 19(A) through 19(D).

The glass sheet G heated by a furnace 55 is horizontally conveyed by conveyor rolls 56 in the furnace 5 and the conveyor rolls 58, 58a to a shaping position between the upper and lower molds 43, 44. FIG. 19(A) shows the glass sheet G delivered to such a shaping position.

Then, the fluid cylinder units 59 (FIG. 16) are actuated to lower the conveyor rolls 58a into the slots 60 in the lower mold 44 at a speed close to the gravitational acceleration. As the conveyor rolls 58a descend, the glass sheet G is lowered until its peripheral edge is supported on the upper surface of the ring mold 45, as shown in FIG. 19(B), whereupon the fluid cylinder units 59 are inactivated. Simultaneously with the downward movement of the conveyor rolls 58a, the fluid cylinder unit 47 is operated to lower the upper mold 43.

The upper mold 43 is moved downwardly to bend the glass sheet G to the desired curvature between the complementary shaping surfaces of the upper and lower molds 43, 44, as shown in FIG. 19(C). At the same time, the peripheral edge of the glass sheet G is also shaped between the lower shaping surface of the upper mold 43 and the upper surface of the ring mold 45.

Thereafter, the fluid cylinder units 52 are actuated to lower the lower mold 44 for a prescribed distance, and the fluid cylinder unit 47 is also actuated to lift the upper mold 43 for the same distance, as illustrated in FIG. 19(D). The glass sheet G is then supported by the ring mold 45 and positioned between the upper and lower molds 43, 44 in spaced relation thereto. In this position, cooling air is ejected from the nozzles 61 in the upper and lower molds 43, 44 against the shaped glass sheet G. Concurrent with this, the oscillation device 54 is operated to move the glass sheet G reciprocally in a circular or elliptical horizontal path for allowing the cooling air to be applied uniformly to the glass sheet G.

After the glass sheet G has been quenched and tempered, it is delivered by the conveyor rolls 58 out of the bending apparatus 41 to a next processing station.

In the above third embodiment, the bending apparatus 41 has the upper mold 43, the lower mold 44, and the ring mold 45. However, the bending apparatus may be arranged such that only the lower mold, or the ring mold used as the lower mold, or the upper mold and the ring mold are employed for bending glass sheets. FIG. 20 shows a ring mold 85 used as a lower mold. The ring mold 85 has a continuous annular upper shaping surface extending along the peripheral edge of a glass sheet to be bent thereby. Conveyor rolls 98 are surrounded by the ring mold 85 and accommodated in spaces beneath the upper shaping surface of the ring mold 85.

According to the third embodiment, the lower mold has the continuous peripheral portion with the slots or space defined only in the central area of the lower mold for receiving the conveyor rolls. The peripheral edge of the glass sheet G can therefore be bent uniformly and is free from optical defects.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. An apparatus for bending a glass sheet, comprising:
a lower mold having an upper shaping surface;
conveyor means for conveying the glass sheet as heated to a prescribed position over said shaping surface of said lower mold, said conveyor means including a plurality of rolls for supporting the glass sheet in said prescribed position;
means for vertically moving said rolls between an elevated position to support the glass sheet in said prescribed position and a lowered position below said shaping surface of said lower mold; and
means in said lower mold for accommodating said rolls when they are moved into said lowered position.

2. An apparatus according to claim 1, wherein said shaping surface of said lower mold is substantially coextensive with said glass sheet, and said accommodating means comprises slots defined in said shaping surface.

3. An apparatus according to claim 2, wherein said slots extend fully across said shaping surface to divide the same into segments.

4. An apparatus according to claim 2, wherein said slots are defined only in a central area of said shaping surface, said shaping surface being continuous along a peripheral edge portion thereof.

5. An apparatus according to claim 1, wherein said lower mold is of a ring-shaped construction having a shaping surface substantially coextensive with a peripheral edge portion of said glass sheet, and said accommodating means comprises a space surrounded by said lower mold and disposed beneath said shaping surface.

6. An apparatus according to claim 1, wherein said lower mold is of a ring-shaped construction having a shaping surface substantially coextensive with a peripheral edge portion of said glass sheet, and said accommodating means comprises slots defined in and extending fully across said shaping surface to divide the same into segments.

7. An apparatus according to claim 6, wherein said lower mold comprises a central member, a pair of side members angularly movable between open and closed positions with respect to said central member, and pivots by which said central and side members are pivotally coupled to each other.

8. An apparatus according to claim 1, further including means for quenching the glass sheet as bent.

9. An apparatus according to claim 8, wherein said quenching means comprises a plurality of nozzles disposed in said upper shaping surface of said lower mold for ejecting a cooling fluid.

10. An apparatus according to claim 8, further including means operable in coaction with said quenching means for horizontally oscillating the glass sheet as bent.

11. An apparatus according to claim 10, wherein said oscillating means comprises means for supporting the glass as bent, a movable member connectable to said supporting means, drive means for horizontally moving said movable member in a circular or elliptical path, and a motor operatively coupled to said drive means.

12. An apparatus according to claim 11, wherein said drive means comprises a guide plate mounted on said movable member and having a pair of slots defined in said guide plate and extending horizontally in mutually perpendicular directions, a pair of rotors having a pair of respective pins engaging in said slots, respectively, and a drive shaft having portions for simultaneously driving said rotors.

13. An apparatus according to claim 1, including a felt sheet attached to said shaping surface of said lower mold.

14. An apparatus according to claim 13, wherein said felt sheet comprises an outer layer of thermally resistant fibers and an inner layer of mechanically strong fibers disposed beneath said outer layer.

15. An apparatus according to claim 1, further including:
an upper mold having a lower shaping surface confronting said upper shaping surface of said lower mold;
an auxiliary ring mold having an upper surface confronting a peripheral edge portion of said lower shaping surface of said upper mold, said auxiliary ring mold being disposed in surrounding relation to said upper shaping surface of said lower mold;
means for vertically moving said lower mold between a shaping position and a non-shaping position;
means for vertically moving said upper mold between a shaping position and a non-shaping position; and
means supporting said auxiliary ring mold.

16. An apparatus according to claim 15, wherein said upper mold has a plurality of nozzles mounted in said lower shaping surface for ejecting a cooling fluid.

17. An apparatus according to claim 16, including movable members movable in different horizontal directions, and said means supporting said auxiliary ring mold being movable with said movable members.

18. A method of bending a glass sheet, comprising the steps of:
conveying the glass sheet as heated horizontally to a position over the upper shaping surface of a lower mold;
stopping the glass sheet when it is deposited on a plurality of rolls which support the glass sheet in said prescribed position; and
moving said rolls from an elevated position in which they support the glass sheet in said prescribed position to a lowered position below said shaping surface of the lower mold, during which time said glass sheet is transferred onto said shaping surface, whereby said glass sheet is bent into conformity with said shaping surface under gravitational forces.

19. A method according to claim 18, wherein when said rolls are moved into said lowered position, they are accommodated respectively in slots defined in said shaping surface of the lower mold.

20. A method according to claim 18, wherein when said rolls are moved into said lowered position, they are accommodated in a space surrounded by said lower mold beneath said upper shaping surface of the lower mold.

21. A method according claim 18, further including the step of quenching and tempering the glass sheet as bent with a cooling fluid.

22. A method according to claim 21, wherein the glass sheet as bent is horizontally oscillated at the same time that the glass sheet is quenched and tempered.

23. A method for bending a glass sheet, comprising the steps of:
conveying the glass sheet as heated horizontally to a prescribed position over the upper shaping surface of a lower mold;
stopping the glass sheet when it is deposited on a plurality of rolls which support the glass sheet in said prescribed position;
moving said rolls from an elevated position in which they support the glass sheet in said prescribed position to a lowered position below said shaping surface of the lower mold, during which time said glass sheet is transferred onto said shaping surface; and
lowering an upper mold simultaneously with the movement of said rolls into said lowered position, whereby said glass sheet is press bent between said upper and lower molds.

24. A method according to claim 23, wherein when said rolls are moved into said lowered position, they are accommodated respectively in slots defined in said shaping surface of the lower mold.

25. A method according to claim 23, wherein when said rolls are moved into said lowered position, they are accommodated in a space surrounded by said lower mold beneath said upper shaping surface of the lower mold.

26. A method according claim 23, further including the step of quenching and tempering the glass sheet as bent with a cooling fluid.

27. A method according to claim 26, wherein the glass sheet as bent is horizontally oscillated at the same time that the glass sheet is quenched and tempered.

28. A method for bending a glass sheet, comprising the steps of:
conveying the glass sheet as heated horizontally to a prescribed position over the upper shaping surface of a lower mold;
stopping the glass sheet when it is deposited on a plurality of rolls which support the glass sheet in said prescribed position;
moving said rolls from an elevated position in which they support the glass sheet in said prescribed position to a lowered position below said shaping surface of the lower mold;
depositing said glass sheet at a peripheral edge portion thereof on an auxiliary ring mold extending around said shaping surface of said lower mold while said rolls are moved from said elevated position to said lowered position; and lowering an upper mold simultaneously with the movement of said rolls into said lowered position, whereby the central area of said glass sheet is press bent between said upper and lower molds.

29. A method according to claim 28, wherein when said rolls are moved into said lowered position, they are accommodated respectively in slots defined in said shaping surface of the lower mold.

30. A method according to claim 28, wherein when said rolls are moved into said lowered position, they are accommodated in a space surrounded by said lower mold beneath said upper shaping surface of the lower mold.

31. A method according to claim 28, further including the steps of:

after said glass sheet has been press bent between said upper and lower molds, moving said lower mold downwardly a prescribed distance to hold the bent glass sheet on said auxiliary ring mold; and quenching and tempering said glass sheet with a cooling fluid.

32. A method according to claim 31, wherein the glass sheet as bent is horizontally oscillated at the same time that the glass sheet is quenched and tempered.

33. A method according to claim 31, further including the steps of:

after said glass sheet has been quenched and tempered, moving said rolls and said upper mold into corresponding elevated positions, during which time said bent glass sheet is lifted off said auxiliary ring mold into said prescribed position; and conveying said bent glass sheet horizontally from said prescribed position to a next processing station.

34. A method according to claim 28, further including the steps of:

after said glass sheet has been press bent between said upper and lower molds, moving said lower mold downwardly for a prescribed distance;

raising said upper mold for a distance equal to said prescribed distance;

holding said bent glass sheet on said auxiliary ring mold; and quenching and tempering said bent glass sheet with a cooling fluid between said upper and lower molds.

35. A method according to claim 34, wherein the glass sheet as bent is horizontally oscillated at the same time that the glass sheet is quenched and tempered.

36. A method for bending a glass sheet, comprising the steps of:

conveying the glass sheet as heated horizontally to a prescribed position over the upper shaping surface of a lower mold;

stopping the glass sheet when it is deposited on a plurality of rolls which support the glass sheet in said prescribed position;

moving said rolls from an elevated position in which they support the glass sheet in said prescribed position to a lowered position below said shaping surface of the lower mold;

depositing said glass sheet at a peripheral edge portion thereof on said shaping surface of said lower mold substantially in a ring shape while said rolls are moved from said elevated position to said lowered position, said lower mold being composed of a central member and a pair of side members pivotally coupled thereto and angularly movable about pivots between open and closed position with respect to said central member, said side members being capable of starting to turn from said open position to said closed position when said rolls have been moved to said lowered position;

lowering an upper mold simultaneously with the movement of said rolls into said lowered position and the turning movement of said side members; and press bending said glass sheet between said upper and lower molds when said side members have reached said closed position.

* * * * *